(12) United States Patent
Woodell et al.

(10) Patent No.: US 7,783,427 B1
(45) Date of Patent: Aug. 24, 2010

(54) COMBINED RUNWAY OBSTACLE DETECTION SYSTEM AND METHOD

(75) Inventors: Daniel L. Woodell, Cedar Rapids, IA (US); Richard D. Jinkins, Rewey, WI (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1072 days.

(21) Appl. No.: 11/486,774

(22) Filed: Jul. 14, 2006

(51) Int. Cl.
*G01S 13/08* (2006.01)
(52) U.S. Cl. ..................................... 701/301; 340/961
(58) Field of Classification Search .................. 701/301, 701/3, 4, 206, 207, 120, 13–14; 340/961, 340/933, 963, 979, 972, 435; 342/29, 36, 342/59, 455, 456, 37; 343/5
See application file for complete search history.

(56) References Cited

U.S. PATENT DOCUMENTS

| | | | |
|---|---|---|---|
| 3,781,878 A | 12/1973 | Kirkpatrick | |
| 3,885,237 A | 5/1975 | Kirkpatrick | |
| 4,259,658 A | 3/1981 | Basov et al. | |
| 5,198,819 A | 3/1993 | Susnjara | |
| 5,661,486 A | 8/1997 | Faivre et al. | |
| 5,945,926 A * | 8/1999 | Ammar et al. | 340/970 |
| 6,018,698 A * | 1/2000 | Nicosia et al. | 701/214 |
| 6,236,351 B1 | 5/2001 | Conner et al. | |
| 6,311,108 B1 * | 10/2001 | Ammar et al. | 701/16 |
| 6,388,607 B1 | 5/2002 | Woodell | |
| 6,388,608 B1 | 5/2002 | Woodell et al. | |
| 6,424,288 B1 | 7/2002 | Woodell | |
| 6,591,171 B1 | 7/2003 | Ammar et al. | |
| 6,597,305 B2 | 7/2003 | Szeto et al. | |
| 6,603,425 B1 | 8/2003 | Woodell | |
| 6,606,563 B2 | 8/2003 | Corcoran, III | |
| 6,850,185 B1 | 2/2005 | Woodell | |
| 2002/0089432 A1 | 7/2002 | Staggs et al. | |
| 2002/0147544 A1 | 10/2002 | Nicosia et al. | |
| 2002/0163461 A1 | 11/2002 | Smithey | |
| 2003/0225487 A1 | 12/2003 | Robert et al. | |
| 2003/0227395 A1 | 12/2003 | Zeineh | |

OTHER PUBLICATIONS

U.S. Appl. No. 10/941,616, filed Sep. 15, 2004, Woodell et al.
U.S. Appl. No. 10/631,316, filed Jul. 31, 2003, Woodell.
Jones, Denise R., "Runway Incursion Prevention System Simulation Evaluation", presented at 21st Digital Avionics Conference, Irvine, CA, Oct. 27-31, 2002, 12 pages.
Young, S.D. et al., "Runway Incursion Prevention: A Technology Solution", presented at the Joint Meeting of the Flight Safety Foundation's 54th Annual International Air Safety Seminar, the International Federation of Airworthiness' 31st International Conference, and the International Air Transport Association, Athens, Greece, Nov. 5-8, 2001, cover page and pp. 221-237.

* cited by examiner

*Primary Examiner*—Dalena Tran
(74) *Attorney, Agent, or Firm*—Matthew J. Evans; Daniel M. Barbieri

(57) ABSTRACT

An incursion detection system can be utilized with an aircraft. The incursion detection system can be utilized to determine a possible presence of obstacles associated with a runway, taxiway, or other path of an aircraft. The incursion detection system preferably utilizes a sensor, such as a radar system, and a signal received on a wireless receiver. The wireless receiver can be part of an ADS-B system. A processing device determines a presence of at least one obstacle in a path based upon first data derived from the wireless receiver and/or second data received from the sensor.

20 Claims, 5 Drawing Sheets

COMBINED RUNWAY OBSTACLE DETECTION SYSTEM AND METHOD

BACKGROUND

The present application relates generally to a sensor system for detecting obstacles on a runway or defined other region. More particularly, the present application relates to a combined airborne radar or other airborne sensor system that is capable of detecting obstacles within a defined region or runway and is capable of using signals from multiple sources.

Incursion systems, such as runway incursion systems, are utilized to determine if an obstacle is in the path of an aircraft or other vehicle. Conventional runway incursion systems are generally one of two types. The first type utilizes signals cooperatively provided from the obstacle on the runway; the second type utilizes radar or other electromagnetic energy signals to actively sense the presence of an obstacle on the runway without the obstacles active cooperation.

Incursion systems, such as runway incursion systems, are utilized to determine if an obstacle is in the path of an aircraft or other vehicle. Conventional runway incursion systems are generally one of two types. The first type requires equipment operating on the obstacles or some form of ground-based infrastructure. The aircraft that is to be protected relies on operating equipment not on the aircraft. These systems are not stand-alone systems. The second type requires neither ground infrastructure nor the obstacle to be equipped in a special way. These are stand-alone systems. Stand-alone systems treat the obstacle as a target or the obstacle as a source or reflector of electromagnetic energy. Radar, light detection and ranging (LIDAR) systems, forward looking infrared (FLIR) systems, or optical camera based systems are examples of this stand-alone obstacle detection system type. Conventionally, the first type of runway incursion system relies upon principles associated with traffic alert and collision avoidance system (TCAS) and automatic dependent surveillance broadcasts (ADS-B) systems.

TCAS systems are required for all airliners flying in the United States air space today. TCAS devices have been designated to interrogate transponders of other aircrafts, sometimes referred to as intruder aircraft. The TCAS system evaluates the threat of collision with the other aircraft and coordinates an avoidance maneuver for the aircraft.

ADS-B systems are capable of providing position, velocity, and status information broadcast from an aircraft at regular intervals using information obtained from global positioning system (GPS) satellites and onboard systems. ADS-B systems may use the Mode S transponders and provide transmissions at regular intervals. Accordingly, ADS-B transponders need not be interrogated.

In an ADS-B system, a Mode S transponder may be disposed in a first aircraft that continuously emits a squitter message. The squitter message is a radio frequency (RF) signal that is generated by the radio-based transponder. In an ADS-B system there is not necessarily a reply to the ADS-B squitter message.

In one conventional runway obstacle detection system of the first-type, objects which may enter a runway, such as baggage carts, runway tugs, other aircraft, emergency vehicles, maintenance vehicles, etc., may carry transponders which provide location information. The location information can be generated from a GPS receiver (e.g., in an ADS-B type system). The transponders may relay information to a central control system which determines whether the object is on the runway. The location information can be provided directly to the aircraft or to the aircraft from the central control system.

Such a system requires that all objects which would potentially incur the runway space would be tagged with a transponder and all transponders remain functioning properly. In many situations, such as in underdeveloped areas, for example, in third world countries, or small airports and the like, sufficient infrastructure may not be available to support tagging each cart with a transponder and to have an appropriate central control system. Further, such systems cannot provide transponders to obstacles that cannot be tagged. For example, deer and other large animals may present a hazard if they wander onto a runway.

U.S. Pat. No. 6,850,185, entitled, "Runway Obstacle Detection System and Method" invented by Woodell and assigned to the Assignee of the present application describes an example of the second-type of conventional runway incursion system. U.S. Pat. No. 6,850,185 describes a weather radar system that utilizes active sensing of obstacles by transmitting electromagnetic beams and receiving the beam that bounces off obstacles in the path of the aircraft. This system does not require the obstacle to operate in a cooperative way. Therefore, this system can be considered both stand-alone and non-cooperative in nature. U.S. application Ser. No. 10/941,616 filed by Woodell et al. on Sep. 15, 2004 and assigned to the Assignee of the present application discloses a radar for detecting obstacles. U.S. Pat. No. 6,850,185 and U.S. patent application Ser. No. 10/941,616 are incorporated herein by reference. Such radar-based obstacle systems are subject to all the accuracy issues, detection rate issues and false alarm rate issues inherent in a radar-based detection system.

In another cooperative conventional runway obstacle detection system, land-based radar systems are used to detect runway obstacles. Land-based radar systems require infrastructure at each airport and can be susceptible to similar difficulties associated with airborne-based obstacle detection systems. An L-band system is being considered which uses signal transmission times as opposed to GPS systems to determine location. NASA is developing a runway incursion prevention system (RIPS) based upon ADS-B equipped aircraft, an airport database and an L-band data path.

Conventional incursion systems of the first and second-type have disadvantages. For example, ADS-B-type runway incursion systems cannot provide protection against vehicles or other obstacles that are not equipped with ADS-B transponders. If construction equipment does not include an ADS-B transponder, that equipment does not appear as an obstacle in an ADS-B system. Although weather radar systems and other sensors can detect obstacles that do not include transponders, weather radar systems and other sensors are not able to duplicate the positional accuracies, detection rates, and low false alarm rates associated with ADS-B-type systems. Further, weather radar systems and other sensors may not be able to detect obstacles that are shielded by other solid obstacles or obstacles that are susceptible to inaccurate detection by radar techniques.

Conventional runway alerting and annunciation systems may be used at the pilot interface. However, such systems may be disadvantageous as alerts by the system are called out aurally to the pilot. Such systems produce annunciations of location state changes of the aircraft. State changes such as entering or exiting an active runway or taxiway are annunciated even if these state changes do not represent an active threat. Such aural warnings may be distracting amongst the other chatter and alarms which pervade the cockpit. Accordingly, it is desirous to reduce the number of "false alarms" provided by runway incursion systems.

Accordingly, there is a need for a more accurate obstacle detection system which does not solely rely upon radar sensing or ADS-B based sensing. Accordingly, there is also a need for a radar system that allows the aircraft to operate autonomously in the U.S. and worldwide at any airport whether the airport being a minor airport or a major airport or whether the airport is in the U.S. or in any country. Further, there is a need for a runway obstacle detection system in which accuracy is increased and false alarms are decreased.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to an incursion detection system. The incursion detection system includes a radar system, a wireless receiver and a processing device. The radar system, the wireless receiver and the processing device are disposed on the aircraft. The processing device is coupled to the radar system and the wireless receiver or is part of the wireless receiver or part of the radar system. The processing device determines a presence of at least one obstacle in a path based upon first data derived from the wireless receiver and second data received from the radar system.

Another exemplary embodiment relates to a sensing system for an aircraft. The sensing system includes a sensing device for sensing objects outside of an aircraft using reflections from transmitted electromagnetic radiation. The system also includes a receiver for receiving position data associated with objects outside of the aircraft and a processing device. The processing device can be part of the receiver or the sensing device. Alternatively, the processing device is coupled to the receiver and the sensing device. The processing device determines a presence of at least one obstacle on a runway using the sensing device and the wireless receiver.

Still another exemplary embodiment relates to a method of detecting an obstacle on a runway. The method includes retrieving location information relating to the location of an aircraft, and sensing within the perimeter of the runway the presence of an obstacle using radar. The method also includes receiving position information associated with the position of the obstacle on an RF signal associated with a cooperative system, and comparing a first position derived from the RF signal and a second position associated with the presence of the obstacle sensed using radar.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
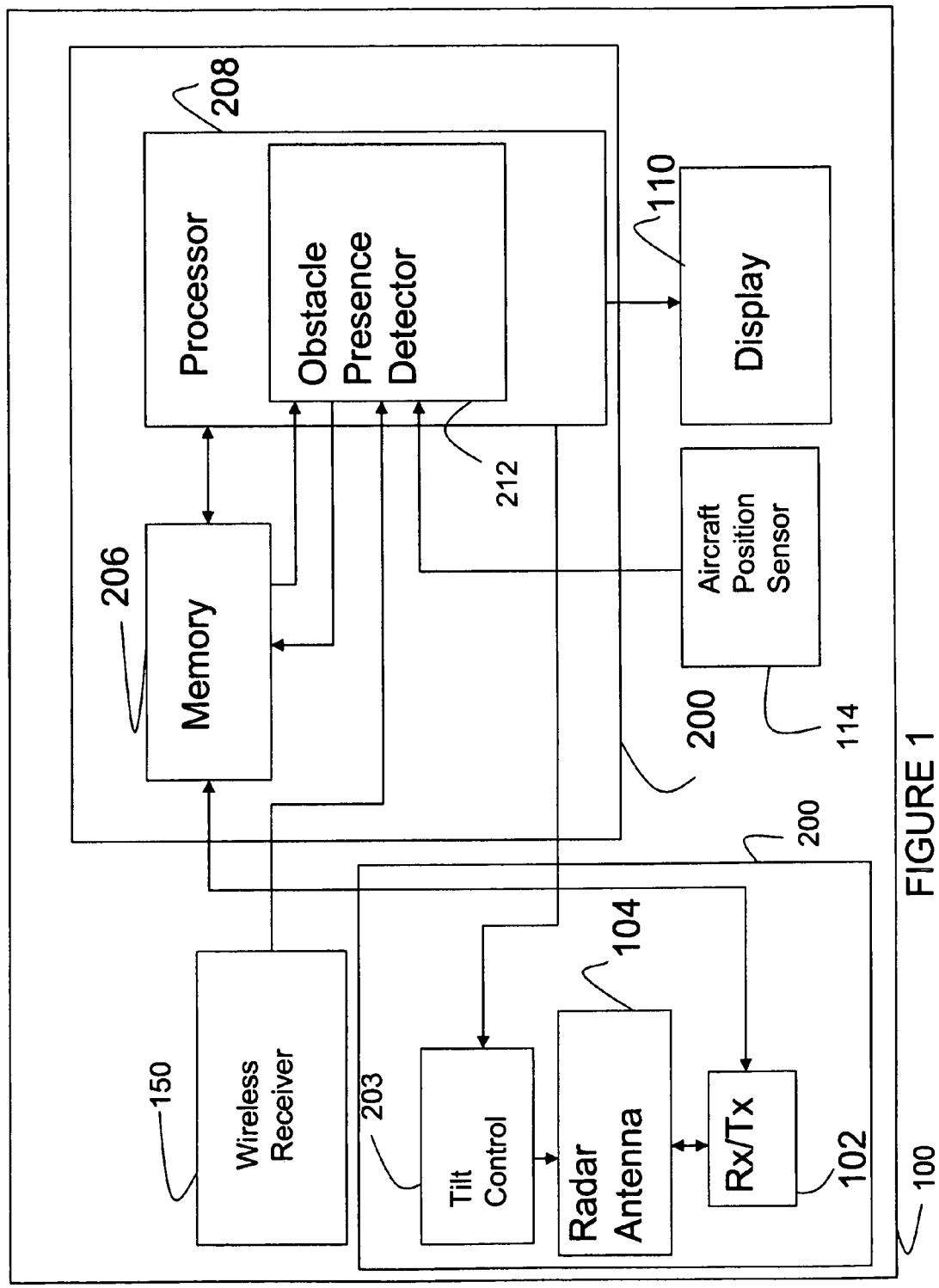
FIG. 1 is a general block diagram of a runway incursion system in accordance with an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, runway incursion system 100 advantageously utilizes a wireless receiver 150 and an electromagnetic reflection sensor or weather radar system 200. System 100 advantageously compares the information derived from wireless receiver 150 and weather radar system 200 in an obstacle presence detector 212 to detect a presence and location of obstacles in a path of the aircraft.

In one embodiment, the path of the aircraft is a runway. The obstacles can be detected before or during takeoff and before or during and after landing in one embodiment. System 100 can be utilized during taxi as well.

By utilizing wireless receiver 150 and system 200, incursion detection system 100 provides both better detection characteristics and better false alarm rate statistics. For obstacles that are not equipped with transponders associated with wireless receiver 150, system 200 can provide data for detection. For obstacles at the end of a pathway, such as a runway edge, where positional accuracy of system 200 is less reliable, confirmation or denial using the information derived from receiver 150 can provide reduced false alarm rates. In addition, targets or obstacles that do have transponders associated with receiver 150 and yet are not detectable by system 200 can still be detected through receiver 150. In the same fashion, on-aircraft obstacle detection systems that normally require ground-based infrastructure may have obstacles detected by system 200 even when the ground-based infrastructure is missing or inoperable. System 100 can advantageously be employed in any type of aircraft, including commercial aviation equipment, where runway incursion and other obstacle detection is desired.

Weather radar system 200 may be used on an aircraft for weather detection and communicate with or be part of system 100. Weather radar system 200 can be similar to the systems described in U.S. Pat. Nos. 6,850,185, 6,603,425 and 6,388,608. In one embodiment, system 200 is a multi-scan system manufactured by Rockwell Collins, Inc. and configured to include an obstacle presence detector 212. Alternatively, a volumetric scanning system manufactured by Honeywell, Inc. could be configured to include detector 212 without departing from the scope of the invention. Other embodiments could include a normal single beam radar system with either manual or automatic antenna elevation control provided by processor 208 without departing from the scope of the invention.

Weather radar system 200 includes a weather radar receiver/transmitter 102, a weather radar adjustable antenna 104, a processor 208, and a memory 206. System 200 also includes a tilt control 203 for automatically controlling the tilt angle (mechanical or electronic) of the antenna 104; this auto control may include an additional manual control feature as well.

Memory 206 is preferably capable of storing in a readily addressable and rapidly retrievable manner, data sets resulting from antenna sweeps and can be a multi-scan, multi-tilt angle memory. Although preferred types of memory are discussed as memory 206, system 200 can utilize any type of storage system capable of storing radar returns or associated data for analysis/processing by processor 208. In one alternative embodiment, memory 206 can be a volumetric storage unit.

The data in memory 206 or other storage unit can be used by obstacle presence detector 212 to determine weather that should be displayed on display 110. Display 110 can be part of an avionic multi-function display (MFD) unit. Processor 208 can be a multi-scan, multi-tilt angle, weather radar and can perform the customary functions performed by a conventional weather radar return processing unit, plus it can perform several additional operations based upon the additional data available in a multi-scan, multi-tilt angle-type of memory 206. In general, processor 208 can merge or cross qualify portions, or ranges, of the radar returns of several different antenna sweeps at several different tilt angles, so that a single relatively clutter-free image is presented to the pilot based upon the several separate scans.

System 200 can operate according to the scanning process of U.S. Pat. No. 6,850,185 or U.S. patent application Ser. No. 10/941,616. Preferably, processor 208 processes weather radar returns to identify or sense the presence of obstacles in front of or in view of the aircraft.

System 200 utilizes a software routine on processor 208 to embody obstacle presence detector 212. Detector 212 can analyze returns and determine the location of objects detected by system 200. In one embodiment, system 200 provides relative positional data, (e.g., as range and direction data). When appropriate, detector 212 can provide aural warnings of obstacles or provide visual indications on display 110.

In a preferred embodiment, the routine or routines for detector 212 can be executed on one or more digital signal processors associated with system 200. In one embodiment, system 200 uses a hardware platform of a WXR-2100 weather radar system manufactured by Rockwell Collins, Inc. or an RDR 4000 weather radar system manufactured by Honeywell International, Inc. However, the present invention is not limited to any type of hardware platform.

Processor 208 preferably receives an indication of aircraft position from aircraft position sensor 114. Aircraft position sensor 114 can be a GPS or other navigational device which provides a location of the aircraft to processor 208 and detector 212. Alternatively, sensor 114 can receive an indication of the aircraft location from equipment outside of the aircraft or from a control tower. Processor 208 preferably utilizes the aircraft position to determine an absolute position of the obstacle from the relative position sensed by system 200.

Processor 208 can determine the presence of one, two, three, or more obstacles and calculate the position of those obstacles. Preferably, processor 208 provides the indication of the presence of an obstacle and its location to obstacle presence detector 212. Obstacle presence detector 212 preferably also receives an indication of presence of obstacles through wireless receiver 150. Preferably, wireless receiver 150 also provides a location (e.g., an absolute non-relative location) of the detected obstacles.

Wireless receiver 150 is preferably part of a system which receives locations of obstacles from an outside source. In one embodiment, receiver 150 is part of an ADS-B system and receives an RF signal including positional information associated with an obstacle. Generally, the obstacle can have a transponder that provides a message including the obstacle's location. The message can also include an identification of the obstacle (e.g., truck, plane, and its specific address). The message from the transponder is received by receiver 150.

Alternatively, wireless receiver 150 can receive the positional information from other sources. For example, a centralized system could report the locations of objects through a wireless link to receiver 150. Alternatively a land-based radar system could provide an indication of location of objects through receiver 150.

Obstacle presence detector 212 receives the indications of objects from system 200 and wireless receiver 150. In one embodiment, detector 212 correlates the data and matches obstacles by comparing respective locations. Further, obstacle presence detector 212 can compare known sizes of obstacles to a size determined from returns associated with 200 to assist in correlating objects. In another embodiment, other radar signature data can be used to identify the type of obstacle.

Once correlated, obstacle presence detector 212 compares the locations to determine the number of obstacles and the locations of each obstacle. Redundant obstacles can be removed so that display 110 only displays the appropriate number of obstacles. Although a specific method of identifying and removing redundant obstacles is discussed below, other techniques of removing redundant obstacles can be utilized without departing from the scope of the invention. A redundant obstacle is an obstacle that is sensed by both wireless receiver 150 and radar 200.

Figure 2:
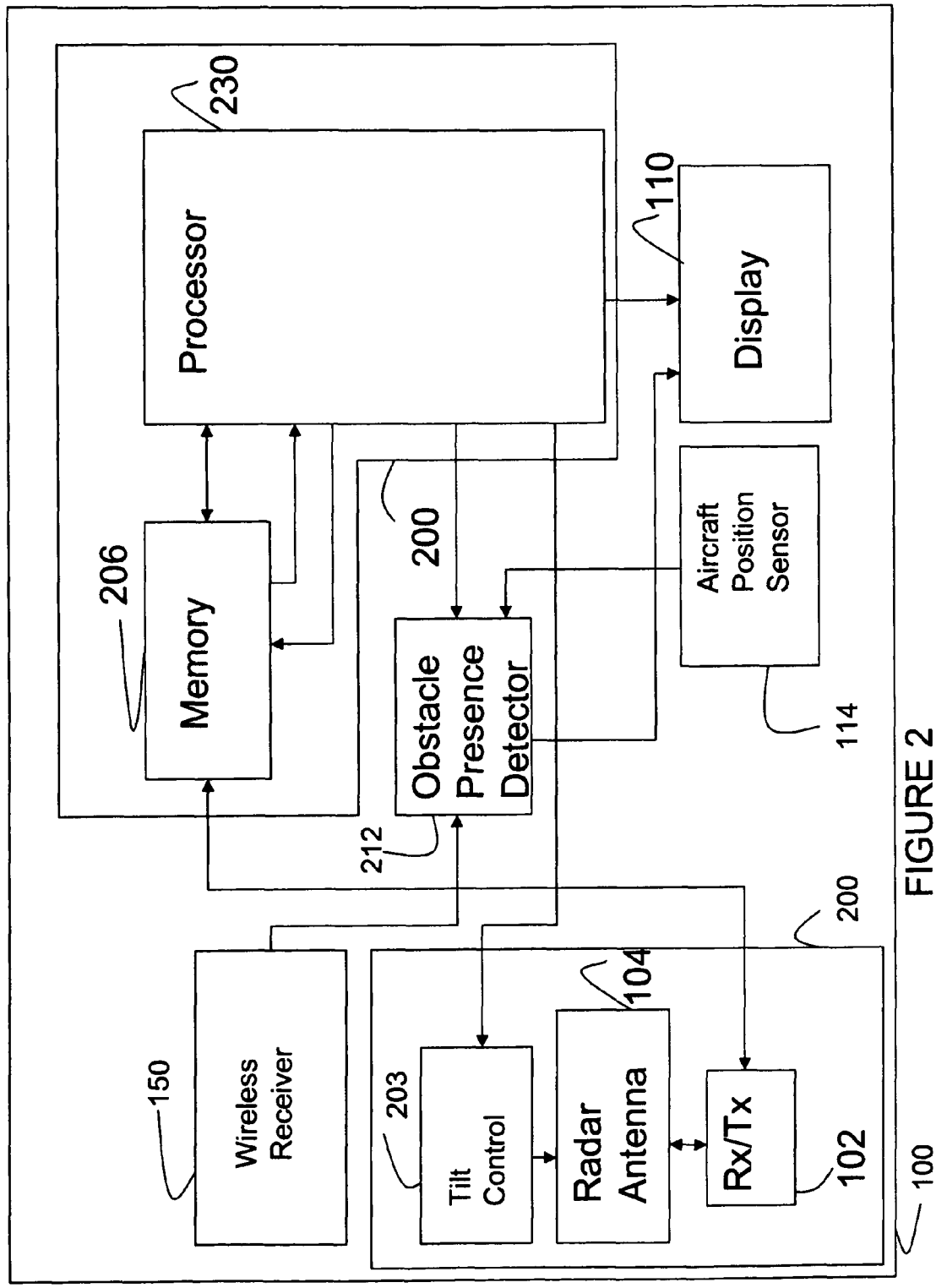
FIG. 2 is a general block diagram of a runway incursion system in accordance with another exemplary embodiment.

With reference to FIG. 2, system 100 is substantially similar to system 100 discussed with reference to FIG. 1 However, obstacle presence detector 212 is shown as a device separate from wireless receiver 150 and system 200. The remaining portions of system 200 can be similar or identical to system 200 of FIG. 2. In FIG. 1, obstacle presence detector 212 is shown as part of system 200.

In FIG. 2, obstacle presence detector 212 is coupled to wireless receiver 150, aircraft position sensor 114, display 110 and weather radar system 200. Obstacle presence detector 212 can be a standalone device or can be implemented in other aircraft equipment. In a preferred embodiment, obstacle presence detector 212 is provided on a hardware platform and is implemented in a software subroutine to provide the functions described herein.

In FIG. 2, obstacle presence detector 212 can be used with its own display or with a display 110 such as a multifunction display associated with system 200. Preferably, the location and indication of obstacles are provided on an display such as a TCAS display, weather radar display, or other screens associated with aircraft navigation and hazard detection.

Figure 3:
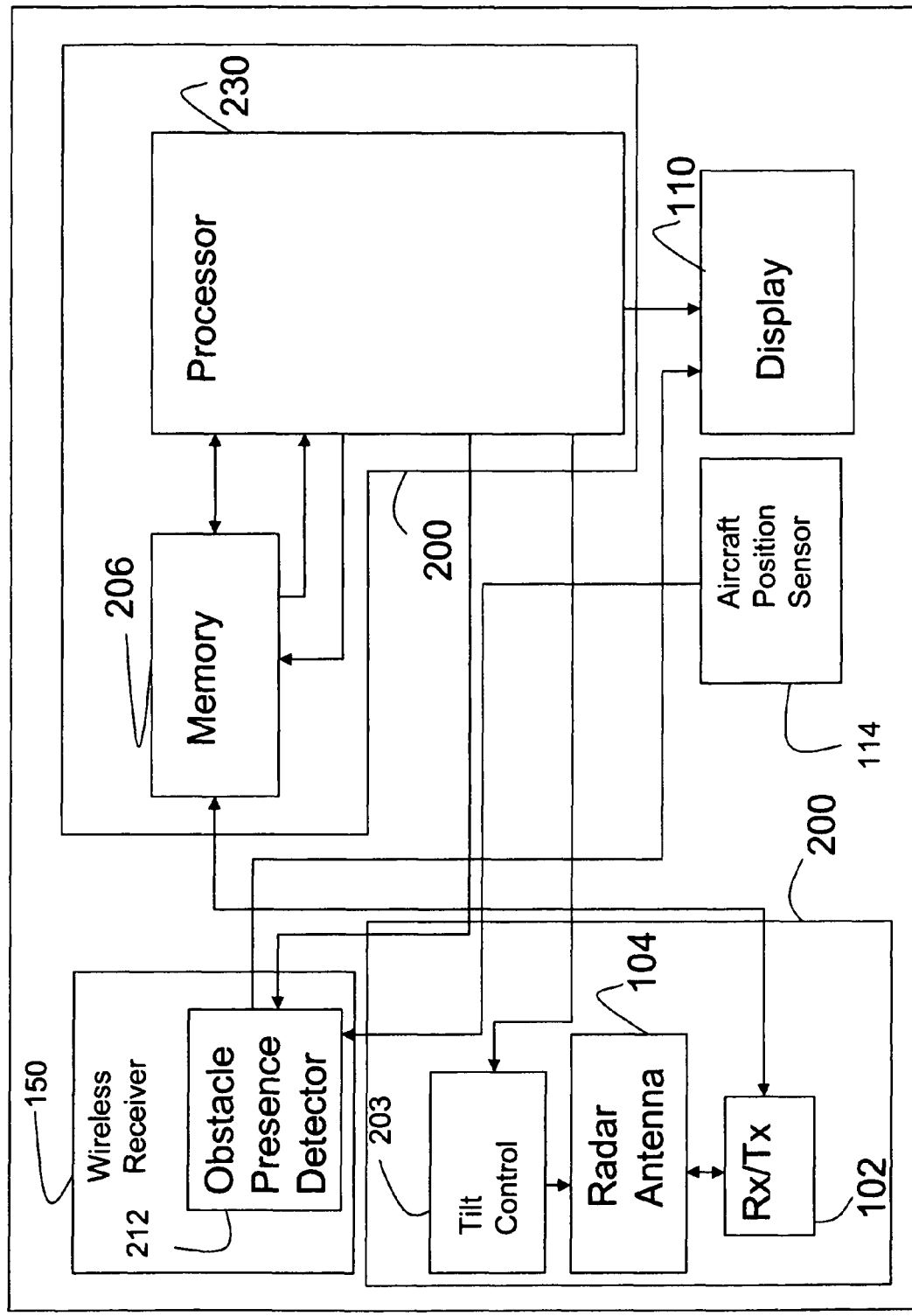
FIG. 3 is a general block diagram of a runway incursion system in accordance with still another exemplary embodiment.

With reference to FIG. 3, obstacle presence detector 212 is shown as part of wireless receiver 150. In a preferred embodiment, obstacle presence detector 212 can be provided as part of an ADS-B system or receiver 150. Obstacle presence detector 212 is coupled to system 200 to receive data associated with the detection and location of obstacles by system 200. System 200 can be similar or identical to system 200 of FIG. 2. Detector 212 can be coupled to display 110 for displaying obstacles and their locations.

Figure 4:
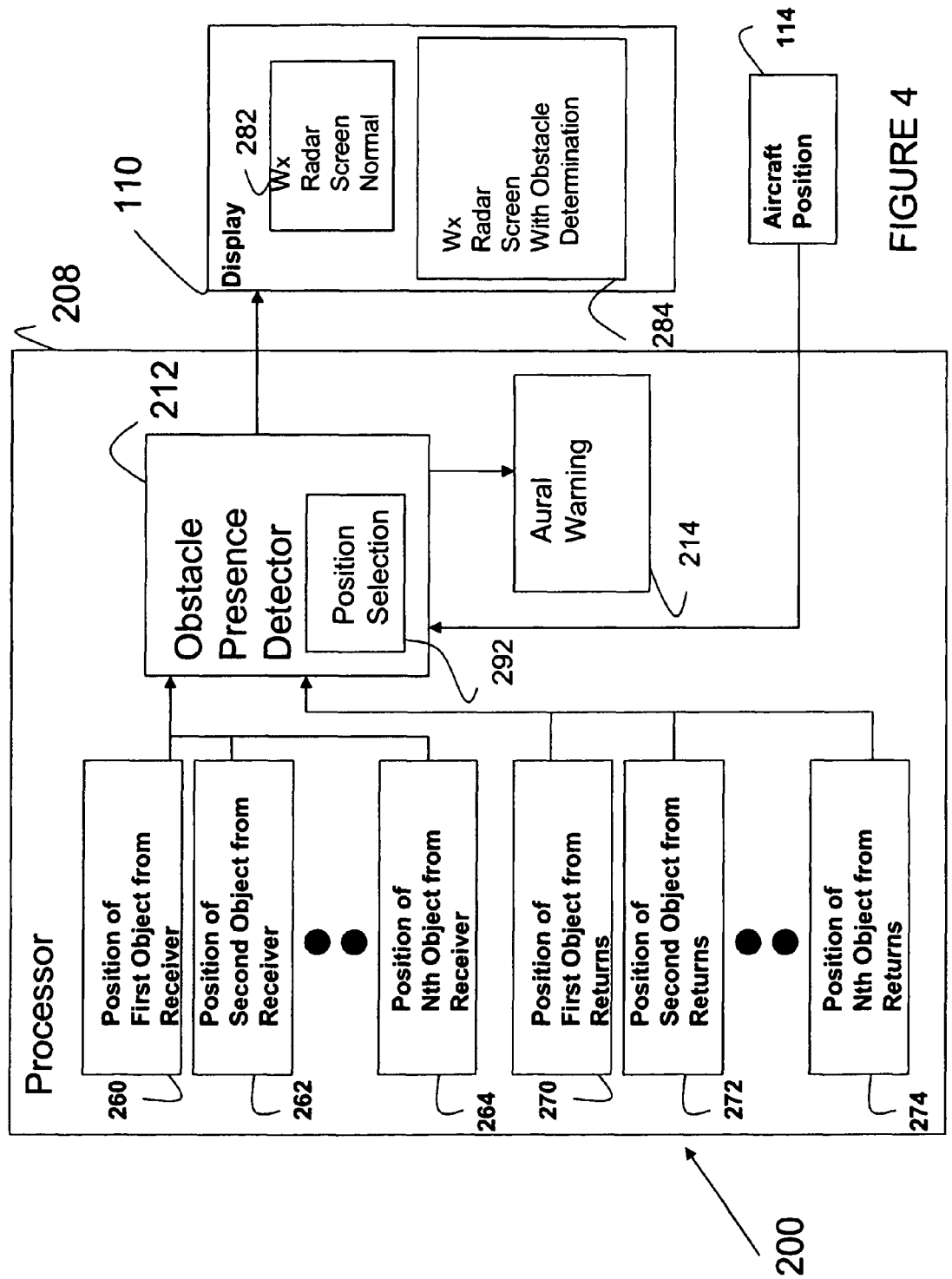
FIG. 4 is a more detailed general block diagram of a processor for use in the runway incursion systems illustrated in FIGS. 1-3 in accordance with another exemplary embodiment.

With reference to FIG. 4, processor 208 or other processor that provides a platform for obstacle presence detector 212 can include memory or other storage for a position of a first object sensed from receiver 150, a position of a second object from receiver 150, a position of an $n^{th}$ object from receiver 150, a position of a first object from returns from system 200, a position of a second object from returns from system 200 and a position of an $n^{th}$ object from returns from system 200. Preferably, the respective positions are stored in memory locations 260, 262, 264, 270, 272 and 274.

Obstacle presence detector 212 receives the data associated with memory locations 260, 262, 264, 270, 272 and 274 and correlates the data after assigning a position for each object. The absolute position can be calculated using the aircraft's position given by sensor 114 and the relative position given by system 200. Preferably, the positions from receiver 150 are absolute positions (e.g. latitude and longitude). The positions derived from system 200 and receiver 150 are preferably converted to the same reference location (latitude and longitude, relative position from the aircraft, etc.) in detector 212 and compared to determine if any objects from receiver 150 and any objects from radar 200 are redundant. If so, position selection circuit 292 removes redundant objects.

Detector 212 displays the detected objects on display 110. Detector 212 can use a special screen 284 on display 110. Screen 282 is a normal weather radar screen and screen 284 is a weather radar screen including obstacle detection. In addition, an aural warning can be provided through a speaker or other system when obstacle presence detector 212 detects a presence of an object.

Alternatively, screen 284 can be dedicated solely to obstacle detection. In one preferred embodiment, the pilot can toggle between screens 282 and 284 based upon a manual input. Alternatively, screen 284 can automatically be provided on display 110 when the aircraft is in a particular flight mode.

Figure 5:
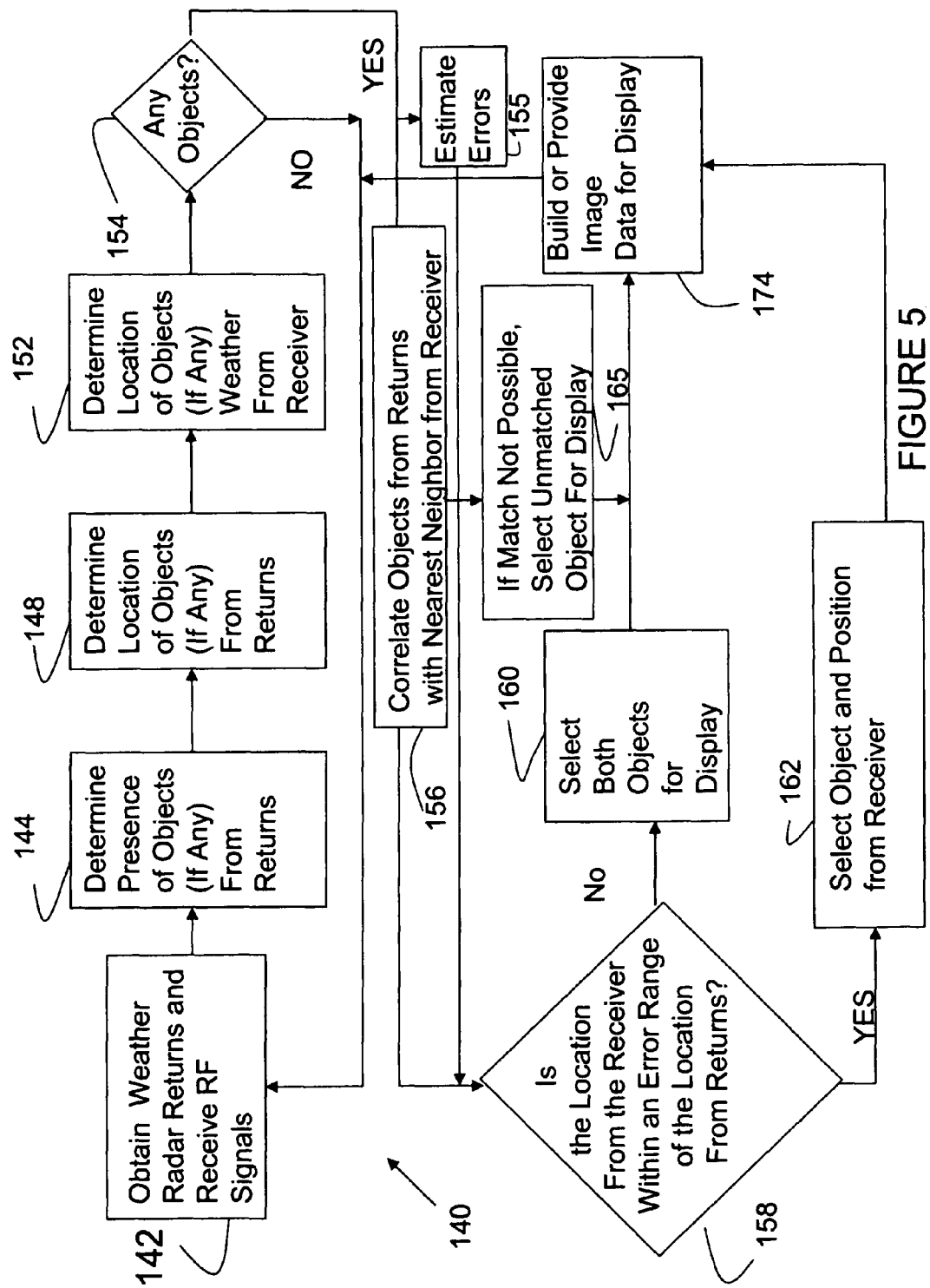
FIG. 5 is a flow chart showing operation of the system illustrated in FIGS. 1-3 in accordance with yet another exemplary embodiment.

With reference to FIG. 5, a flow chart 140 shows general operation of obstacle presence detector 212. At a step 142, weather radar returns are obtained by system 200 and RF signals are obtained by wireless receiver 150. At a step 144, system 200 can determine the presence of any obstacles from radar returns. The presence and location of obstacles from radar returns are provided to detector 212. As discussed above, the absolute location can be determined from a relative location from the aircraft.

Targets or obstacles with known movement vectors can have their position estimates updated to reflect their estimated position between target updates. If target updates have a known latency, this velocity aided position process can remove positional error except in acceleration and deceleration cases. Similar velocity aiding can be used on both the external obstacle data and on-board sensor-based obstacle data. Alternatively, obstacle presence detector 212 can receive the raw data associated with the radar returns and determine the presence and location of obstacles itself.

At a step 152, RF receiver 150 determines the location of the obstacles associated with the RF signals received on receiver 150 and provides the location to detector 212. Alternatively, detector 212 can receive the raw data associated with the RF signals and determine the presence and location of obstacles itself.

At a step 154, obstacle presence detector 212 determines if there are any objects. If there are no objects, system 100 returns to step 142. If there are objects, system 100 advances to a step 156 and correlates the objects detected from returns with objects detected from receiver 150.

At a step 155, the data associated with steps 144, 148, and 152 is utilized to estimate errors associated with the obstacle locations. Data associated with the estimate of errors in step 155 is provided with data associated with the correlated objects from step 156 to step 158. The data associated with step 155 can represent an error range. Accordingly, step 158 receives data associated with positions, proposed correlations, and an error range (preferably an RMS error range).

At a step 158, the matched or correlated objects and their locations are compared to determine if they are within the error range from step 155. If the locations of the correlated objects are within an error range, position selection circuit 292 of obstacle detector 212 selects the object and position from the data provided by receiver 150 and advances to step 174 where image data is built for display 110 or alternatively the obstacle is provided on display 110. If an object can be matched to more than one other position, the object is matched to the nearest position. Alternatively, further analysis can be performed to determine which match is the best match. The further analysis can involve determining a size or type of the object and matching to similar sizes and types. If a match is not possible after step 156, the unmatched object and its location, whether it be derived from weather radar returns or from RF signals from receiver 150, is provided to step 154 for building image data to or for providing the obstacle on display 110.

If in step 158, the location from receiver 150 is not within an error range of the location derived from returns, both objects are selected for display using their respective locations as derived from receiver 150 and returns of system 200.

The error range preferably is a sum of the RMS estimated errors for each system, both the on-board sensor (e.g., system 200) and the system (e.g., receiver 150) that provides obstacle position data by the wireless connection. RMS errors in both systems may not be constant in both axes of the coordinate navigation system being used. As an example, Applicants believe that the radar estimation accuracy across the radar beam is different than along the beam. At very short ranges the across the radar beam accuracy exceeds the range accuracy. In contrast, at longer ranges the across the radar beam accuracy degrades to less accuracy than seen in the along the beam range estimate. Other sensors used to generate data for the wireless path may also have known errors that vary depending on external geometries of sensor/target elements. Using the summation of RMS errors may result in some minor target splitting but Applicants believe the goal of target fusion is generally met.

After step 160, system 100 advances to step 174. After step 174, system 100 returns to step 142.

System 100 can perform the various steps in flowchart 140 in parallel. For example, steps 144, 148 and 152 can be performed in parallel as can steps 156, 165, 158, 160 and 162.

Radar system 200 which is capable of detecting objects on the ground can be replaced by a variety of other airborne sensing systems such as but not limited to synthetic vision systems, millimeter wave sensors, and the like. System 200 can by any system for actively sensing objects by reflection of energy waves.

In an alternative embodiment, detector 212 may be coupled to or part of a hazard warning system which may include any of a variety of warnings such as traffic and weather visual warnings which may be on radar display or visual warnings which may be located in other areas of the cockpit, those warnings being lights, signs, etc. Also, the hazard warning system may include audio warnings which would be annunciated to the crew members within the cockpit. Hazard warning system may utilize any of a variety of techniques for alerting flight crew members of obstacles which are on runway being identified by detector 212.

Further, the configuration shown and described in the block diagram may be varied without departing from the scope of the invention. Further, any of a variety of user interfaces may be used to alert the flight crew. Further still, communications of an identified obstacle may be made to a control tower crew, which either is able to have the runway area cleared before the final approach of the aircraft or is able to relay that alert back to the flight crew. Yet further still, in an exemplary embodiment, any of a variety of radar devices may be used.

The system shown and described may be used as a backup or secondary system to other runway incursion systems, such as but not limited to airport surface detection equipment (ASDE) systems. Further, the system shown and described may be used for taxi and takeoff and landing situations.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. An incursion detection system, the system comprising:
   a radar system disposed on an aircraft;
   a wireless receiver disposed on the aircraft; and
   a processing device disposed on the aircraft coupled to the radar system and the wireless receiver or part of the wireless receiver or the radar system, wherein the processing device determining a presence of at least one obstacle in a path based upon first data derived from the wireless receiver and second data received from the radar system.

2. The system of claim 1, wherein the location of the aircraft is provided using a position sensor in communication with the processing device.

3. The system of claim 1, wherein an error range is determined to remove redundant obstacles.

4. The system of claim 1, wherein a polygon represents a runway or taxi-way, and wherein a runway/taxi-way database is on board the aircraft for defining the polygon.

5. The system of claim 1, wherein the radar system is a weather radar system.

6. The system of claim 1, wherein the wireless receiver is an ADS-B receiver.

7. A sensing system for an aircraft, the system comprising:
   a sensing device for sensing objects outside of an aircraft using reflectors from transmitted electromagnetic radiation;
   a receiver for receiving position data associated with objects outside of the aircraft; and
   a processing device being part of the receiver or the sensing device or coupled to the receiver and sensing device and using the sensing device and the receiver to determine a presence of at least one obstacle on a runway or taxi-way.

8. The sensing system of claim 7, wherein the sensing device comprises a weather radar system.

9. The sensing system of claim 7, wherein the receiver comprises an ADS-B or TCAS receiver.

10. The sensing system of claim 7, wherein the location of the aircraft is provided using a position sensor in communication with the processing device.

11. The sensing system of claim 7, further comprising a display wherein a sensed obstacle is displayed on the display.

12. The sensing system of claim 11, wherein the sensed obstacle is displayed at a position associated with information derived from the receiver.

13. The sensing system of claim 11, wherein the sensed obstacle is displayed at a position associated with information derived from the receiver when the sensed target is detected from information derived from the receiver and the sensing device and a position derived from the sensing device is within an error range from a position of the sensed obstacle derived from the receiver.

14. The sensing system of claim 11, wherein the sensed obstacle is displayed at a position associated with the information derived from the sensing system if a presence of the obstacle is not within a positional error range associated with a sum of the sensing device position estimated error and the receiver estimated error.

15. The sensing system of claim 7, wherein the processing device determines the direction of the radar beam based on the location of the runway or taxi-way.

16. A method of detecting an obstacle on a runway or taxi-way, the method comprising:
    retrieving location information relating to the location of an aircraft;
    sensing within the perimeter of the runway the presence of an obstacle using radar;
    receiving position information associated with a position of the obstacle on an RF signal; and
    comparing a first position derived from the RF signal and a second position associated with the presence sensed using radar.

17. The method of claim 16, further comprising:
    determining the location of the obstacle within the perimeter of the runway or taxi-way location.

18. The method of claim 16, further comprising:
    providing an audio alert to the pilot of the aircraft.

19. The method of claim 16, further comprising:
    providing a visual indication of a location of the object.

20. The method of claim 16, wherein the location is determined in response to the first position and the second position.

\* \* \* \* \*